United States Patent Office 3,813,447
Patented May 28, 1974

---

3,813,447
HYDROPHILIC SYNTHETIC HIGH POLYMERS FOR SOFT CONTACT LENSES AND A PROCESS FOR MANUFACTURING THE SAME
Kyoichi Tanaka, Takeshi Mio, and Toyoyasu Tanaka, Nagoya, Japan, assignors to Toyo Contact Lens Company, Limited, Nagoya, Japan
No Drawing. Filed Sept. 15, 1971, Ser. No. 180,849
Claims priority, application Japan, Sept. 19, 1970, 45/82,164
Int. Cl. C08f 15/40
U.S. Cl. 260—63 UY          6 Claims

ABSTRACT OF THE DISCLOSURE

A hydrophilic synthetic high polymer having an excellent workability and especially sutiable for the preparation of soft contact lenses, artificial corneas, and optical lenses for medical use, and a process for manufacturing the same essentially comprising the steps of preparing a solution by either mixing a 2-hydroxyethyl methacrylate monomer, a vinyl acetate monomer and a cross-linking monomer, or mixing a 2-hydroxyethyl methacrylate monomer, a vinyl acetate monomer and a cross-linking monomer, an N-(1,1-dimethyl-3-oxobutyl) acrylamide, adding a catalyst or initiator for polymerization to said solution, injecting said solution into a mold, heating said mold for co-polymerization of said solution, and cooling the co-polymer thus produced for subsequent removal from said mold. As an alternative, the step of adding a catalyst or initiator for polymerization may be eliminated, and the process may, in this case, include exposing a solution containing mold to Co rays before heating it for co-polymerization of the solution.

DESCRIPTION OF THE PREFERRED EMBODIMENTS

This invention relates to hydrophilic synthetic high polymers for soft contact lenses and a process for manufacturing them.

Various hydrophilic high polymers, such as from hydroxypropyl methacrylate, 2-hydroxy methacrylate and acrylamide monomer, have been known in the prior art. But these polymers all have been brittle and have had a tendency to break easily. They have properties which cause great difficulty in their machining for the manufacture of precisely shaped products. Furthermore, when these polymers are shaped and softened, they have often failed to have the necessary physical and mechanical properties for precisely shaped products, and lose their elasticity to the extent that a slight tension or force can easily break them.

It is, therefore, an objec of this invention to provide an improved synthetic high polymer wherein the above mentioned drawbacks of the polymers known in the prior art are eliminated, and to provide a process for manufacturing such improved high polymers.

It is another object of this invention to provide new uses for such high polymers.

The synthetic high polymer according to this invention is manufactured by a process comprising preparing a solution either by mixing 30 to 5 parts by weight of an N-(1,1-dimethyl-3-oxobutyl) acrylamide, 15 to 5 parts by weight of a vinyl acetate monomer and a cross-linking agent with 70 to 95 parts by weight of a 2-hydroxyethyl methacrylate monomer or by mixing 15 to 5 parts by weight of a vinyl acetate monomer and a cross-linking agent with 70 to 95 parts by weight of a 2-hydroxyethyl methacrylate monomer, heating and co-polymerizing the above solution in a mold, and cooling the co-polymer thus produced followed by removal thereof from the mold. The synthetic high polymer according to this invention is very hydrophilic and sticky, and endures a very precise machining operation. It becomes swollen and soft in several minutes, but retains its original shape even after it has swollen and softened. Accordingly, the synthetic high polymer according to this invention is highly suitable for the manufacture of contact lenses, artificial corneas, and optical lenses for medical use, for example, gonioscopes for examination of the eyes. Such lenses or the like manufactured from the synthetic high polymers of this invention are definitely superior in many respects to those known in the prior art.

The present invention will now be further illustrated by the following non-limitative examples:

EXAMPLE 1

A solution was prepared by mixing 30 parts by weight of an N-(1,1-dimethyl-3-oxobutyl) acrylamide with 70 parts by weight of a 2-hydroxyethyl methacrylate monomer. Fifteen parts by weight of a vinyl acetate monomer was added, and the solution was carefully stirred until the material added became fully dissolved in the solution. One part by weight of ethylene-glycol-dimethacrylate which is a cross-linking agent having two functional groups, was added into the above solution of the three components, and thoroughly mixed therein.

Then, 0.25 part by weight of $\alpha,\alpha'$-azobis(isobutyronitrile) was added as an initiator for polymerization, and the solution was left for a while at an ambient temperature until the initiator became thoroughly mixed into the solution. The solution was then injected into a mold made of polyethylene or Teflon and measuring 15 to 18 mm. in diameter, and the mold was closed in a sealed manner by fitting a stopper into the injection hole. Molds made of other materials, such as plastics, glass and metals, were also found useful, though polyethylene or Teflon are believed to be the best material for the mold.

The stopper used for closing the mold may be made of polyethylene, or alternatively, the mold may be closed without using any such stopper by heating and melting the mold material in the vicinity of the injection hole and thereby closing up the hole.

The mold thus closed in a sealed manner was placed in a bath of warm water and gradually heated up to elevated temperatures. The mold was held at an approximate temperature of 40° C. for 48 hours, at approximately 60° C. for 16 hours, at approximately 70° C. for three hours, and finally at approximately 80° C. for four hours to effect co-polymerization of the solution within the mold. The co-polymer produced during the above heating operation was allowed to cool down to an ambient temperature, and was then removed from the mold. The co-polymer thus formed was found transparent and hydrophilic. It was cut into pieces, and when soaked in water, the cut pieces became swollen with water, and soft.

Physical Properties of the Co-Polymer Produced

Transmission of visible rays: Approx. 90%
Refractive index($n_D^{25}$): 1.4580 (when hydrated)
Water absorption: Approx. 38%
Degree of linear swelling: Approx. 11%
Specific gravity ($d^{25}$): 1.166 (when hydrated)
Hardness (by JIS): 26.5 (when hydrated)

EXAMPLE 2

A solution was prepared by mixing 5 parts by weight of an N-(1,1-dimethyl-3-oxobutyl) acrylamide with 95 parts by weight of a 2-hydroxyethyl methacrylate monomer, and stirring the mixture carefully until the two components formed a thoroughly mixed solution. Five parts by weight of a vinyl acetate monomer was then added to the above solution.

Then, one part by weight of di-vinyl benzene was added, as a cross-linking agent, to the above solution comprising three substances, and the solution was fully stirred until the cross-linking agent was thoroughly dissolved in the solution. Thereafter, 0.25 parts by weight of $\alpha,\alpha'$-azobis isobutyronitrile) was added as an initiator for polymerization, the solution was injected into a mold, and heated, whereby co-polymerization of the solution was promoted. The solution was heated at approximately 40° C. for 48 hours, at approximately 60° C. for 16 hours, at approximately 70° C for three hours, and finally at approximately 100° C. for three hours.

After the mold was allowed to cool, the co-polymer thus produced was taken out of the mold, and found transparent and hydrophilic. The copolymer was cut into several pieces, and when they were soaked in water, they became swollen with water and soft in a matter of a few minutes. It was found useful to use a polyethylene tube as an injection mold.

Physical Properties of the co-polymer produced

Refractive index $n_D{}^{25}$): 1.4412 (when hydrated)
Water absorption: Approx. 52% (when hydrated)
Degree of linear swelling: Approx. 11%
Specific gravity ($d^{25}$): 1.17 (when hydrated)
Hardness (by JIS): 35 (when hydrated)

EXAMPLE 3

Eighty-five parts of weight of a 2-hydroxyethyl methacrylate monomer, 15 parts by weight of an N-(1,1-dimethyl-3-oxobutyl) acrylamide and 15 parts by weight of a vinyl acetate monomer were mixed together by stirring until they formed a solution. One part by weight of ethylene-glycol-dimethacrylate was added to this solution as a cross-linking agent, and the solution was carefully stirred until the cross-linking agent was thoroughly dissolved into the solution. Then, 0.25 parts by weight of $\alpha,\alpha'$-azobis(isobutyronitrile) was added as an initiator for co-polymerization, and the solution was allowed to stand for a while until the initiator was thoroughly dissolved into the solution. The solution was then injected into a mold made of a polyethylene tube of 15 to 18 mm. in diameter. The mold was closed in a sealed manner, and placed in a bath of warm water. The mold was held at a temperature of approximately 40° C. for 48 hours to effect a primary polymerization of the solution within the mold. It was held then at approximately 60° C. for 16 hours, at approximately 70° C. for three hours, and finally at approximately 80° C. for four hours to complete the co-polymerization of the solution.

The co-polymer thus produced was found to be adequately hard, transparent, hydrophilic and readily workable. In an attempt to make a contact lens of this co-polymer, the co-polymer proved to have good machinability, and a satisfactory contact lens was made. The contact lens made was left in water and a physiological saline solution for a total of approximately two years, but substantially no degradation was observed in the quality of the lens. Furthermore, the contact lens withstood boiling over a period of 240 hours.

Physical Properties of the co-polymer produced

Refractive index ($n_D{}^{25}$): 1.4477 (when hydrated)
Water absorption: Aprox. 44.6% (when hydrated)
Degree of linear swelling: Approx. 12%
Specific gravity ($d^{25}$): 1.17 (when hydrated)
Hardness (by JIS): Approx. 30 (when hydrated)

EXAMPLE 4

A solution was prepared by mixing 95 parts by weight of a 2-hydroxyethyl methacrylate monomer with 5 parts by weight of an N-(1,1-dimethyl-3-oxobutyl) acrylamide and then adding 15 parts by weight of a vinyl acetate monomer. One part by weight of ethylene-glycol-dimethacrylate was then added as a cross-linking agent, and the solution was carefully stirred until the agent got thoroughly dissolved in the solution. Then, 0.25 parts by weight of $\alpha,\alpha'$-azobis(isobutyronitrile) was added and dissolved in the solution as an initiator for co-polymerization. The solution was then injected into a polyethylene mold, and the mold was closed in the same manner as used in Example 1. The mold was then placed in a bath of warm water, and held at a temperature of approximately 40° C for 48 hours, at approximately 60° C. for 16 hours, at approximately 70° C. for three hours, and finally at approximately 80° C. for four hours to complete the co-polymerization of the solution. The co-polymer thus produced was allowed to cool down to an ambient temperature, and was then taken out of the mold. It was found transparent and hydrophilic.

The co-polymer produced was cut into the form of thin films, and when soaked in water or a hydrogenous liquid, the thin films of the co-polymer became swollen with water and soft in a matter of several minutes. The softened co-polymer films were not easily damaged or broken when scratched or stretched. The co-polymer also showed a sufficiently good water-proof feature.

Physical Properties of the co-polymer produced

Refractive index ($n_D{}^{25}$): 1.4430 (when hydrated)
Water absorption: Approx. 49% (when hydrated)
Degree of linear swelling: Approx. 13%
Specific gravity ($d^{25}$): 1.17 (when hydrated)
Hardness (by JIS): 33.5 (when hydrated)

EXAMPLE 5

A solution was prepared by mixing 85 parts by weight of a 2-hydroxyethyl methacrylate monomer with 15 parts by weight of a vinyl acetate monomer. It is to be noted that the compositions of this solution are important. Two parts by weight of ethylene-glycol-dimethacrylate was added and dissolved in the solution as a cross-linking agent, and then, 0.25 parts by weight of $\alpha,\alpha'$-azobis (isobutyronitrile) was added as an initiator for polymerization.

The solution thus prepared was injected into a mold, for example, a polyethylene tube of 15 to 18 mm. in diameter, and the mold was closed in the same manner as employed in Example 1. The mold was then placed in a bath of warm water, and heated at a temperature of approximately 40° C. for 48 hours, to effect a primary polymerization of the solution.

The mold was then put into a heating oven, and heated at approximately 60° C. for 16 hours, at approximately 70° C. for three hours, and finally at approximately 80° C. for four hours to effect co-polymerization. After having been allowed to cool, the co-polymer produced was removed from the mold, and was found to be transparent and hydrophilic.

The co-polymer produced was found to have a sufficiently good workability to be formed into any desired shape. When soaked in water, it easily became swollen with water and soft. The softened co-polymer was proved to have a very high tensile strength to be adhesive enough to prevent substantially any cracking of the material.

Physical properties of the co-polymer produced

Refractive index ($n_D{}^{25}$): 1.445
Water absorption: 43.6%
Degree of linear swelling: Approx. 10%
Specific gravity ($d^{25}$): 1.17 (when hydrated)
Hardness (by JIS): 44.5 (when hydrated)

The resistance of the product to a low temperature in the range of −6° C. to −4° C. was found good.

EXAMPLE 6

A solution was prepared by mixing 95 parts by weight of a 2-hydroxyethyl methacrylate monomer with 5 parts by weight of a vinyl acetate monomer. It is to be noted that the compositions of the solution mentioned are important. Then, 2.5 parts by weight of a di-vinyl benzene monomer was added and dissolved in the solution. The solution was then defoamed and injected into a mold of a selected shape, and the mold was closed in the same manner as employed in Example 1. In order to promote co-polymerization of the solution, the mold was exposed to Co(60) X-rays to effect gelation of the solution within the mold. Then, the mold was heated at a temperature of 80° C. for two hours, and at 100° C. for three hours to complete co-polymerization of the gelled solution. The co-polymer removed from the mold conformed in configuration to the selected shape of the mold, and was transparent and hydrophilic.

The molds used in the manufacturing process of the present invention may be circular, rectangular, flat, or of any other shape in section according to the shape of the polymer required. A tube closed at one end was used to produce a round rod-shaped product. The mold used to produce a flat shaped product comprised two hard polyethylene sheets spaced from each other and a gasket disposed to close the periphery of the two polyethylene sheets. In the example hereinabove described, the mold was heated by hot water, but any other means may be equally used to effect heating of the mold. For example, forced circulation heating oven was used. In this case, however, the polymerization of the solution progressed very rapidly and foams formed markedly because the oven was found to absorb the heat of polymerization at a lower rate than the hot water bath.

The effects which variations in the quantities of the various components in the solutions have on the quality of the final products are hereinafter pointed out to illustrate the criticality of the ranges of the various components.

When less than three parts by weight of a vinyl acetate monomer was used, the polymer produced was found too brittle to permit precise machining operation. The contact-lens to be manufactured from the polymer is as thin as 0.2 mm. Even if such polymer could successfully be formed into such a thin lens, the lens would substantially lose its elasticity and restorability to the original shape when it was swollen with water and softened. If more than 15 parts by weight of a vinyl acetate monomer was used, the solution got so muddy white and opaque in the process of co-polymerization that the product could not be used to manufacture an optical instrument. Furthermore, co-polymerization was promoted to the degree close to 100% when the solution contained more than 15 parts by weight of a vinyl acetate monomer, and the polymer produced was too soft to withstand the subsequent machining work.

The use of less than five parts by weight of an N-(1,1-dimethyl-3-oxobutyl) acrylamide resulted in the loss of stickiness in the polymer produced and the lowering of its tensile strength. On the other hand, when more than 30 parts by weight of this amide was used in the solution, the product was so brittle that it could hardly be subjected to any machining work.

Referring now to the cross-linking agent, reduction of ethylene-glycol-dimethacrylate to less than one part by weight caused lowering of the cross-linking effect, so that when it was left in water over a long period of time (approximately one year), the polymer produced gradually melted into water and swelled with water at an increasing rate, resulting in a substantial reduction of its mechanical strength. An increase of this cross-linking agent to more than three parts by weight increased the hardness of the product to such an extent that it could hardly be cut or formed on a machine, while an improvement was observed in the water-proof feature and mechanical stability of the final product. Moreover, the polymer produced did not virtually become soft when it was hydrated, and accordingly, it could not be used as the material for a soft contact lens.

It will be understood that various modifications may be easily made to the examples hereinabove described by those skilled in the art without departing from the scope and spirit of this invention. It will also be noted that the process of this invention may be used to produce a polymer of any desired color if a dye is properly selected and mixed in the solution. Moreover, it will be observed that the synthetic high polymer according to this invention may not only be used for the manufacture of soft contact lenses, but also for many other purposes, including the manufacture of gonioscopes, artificial corneas, and aquatic prisms.

What is claimed is:

1. A hydrophilic synthetic high solid polymer which consists essentially of:
   30 to 5 parts by weight of N-(1,1-dimethyl-3 oxobutyl) acrylamide,
   70 to 90 parts by weight of 2-hydroxyethyl methacrylate,
   15 to 5 parts by weight of vinyl acetate, and
   1 to 3 parts by weight of a cross-linking agent selected from the group consisting of ethylene glycol dimethacrylate and divinyl benzene.

2. A polymer according to claim 1 wherein said N-(1,1-dimethyl-3-oxobutyl) acrylamide is present in about 30 parts by weight, said 2-hydroxyethyl methacrylate in about 70 parts by weight and said vinyl acetate in about 15 parts by weight.

3. A polymer according to claim 2 wherein said cross-linking agent is ethylene glycol dimethacrylate.

4. A soft contact lens manufactured from the synthetic high polymer according to claim 1.

5. A soft contact lens manufactured from the synthetic high polymer according to claim 2.

6. A soft contact lens manufactured from the synthetic high polymer according to claim 3.

References Cited
UNITED STATES PATENTS

| | | | |
|---|---|---|---|
| 3,203,918 | 8/1965 | Goldberg et al. | 260—29.6 |
| 3,503,942 | 3/1970 | Seiderman | 260—80.75 |
| Re. 27,151 | 6/1971 | Hicks | 260—47 UA |

JOSEPH L. SCHOFER, Primary Examiner

S. M. LEVIN, Assistant Examiner

U.S. Cl. X.R.

260—80.75; 351—160